![US008961622B2]

(12) United States Patent
Siggelkow et al.

(10) Patent No.: US 8,961,622 B2
(45) Date of Patent: Feb. 24, 2015

(54) ADDITIVES FOR IMPROVING THE COLD PROPERTIES OF FUEL OILS

(75) Inventors: Bettina Siggelkow, Frankfurt am Main (DE); Werner Reimann, Frankfurt (DE); Matthias Krull, Harxheim (DE)

(73) Assignee: Clariant Finance (BVI) Limited, Tortola (VG)

( * ) Notice: Subject to any disclaimer, the term of this patent is extended or adjusted under 35 U.S.C. 154(b) by 399 days.

(21) Appl. No.: 11/879,458

(22) Filed: Jul. 17, 2007

(65) Prior Publication Data

US 2008/0016755 A1 Jan. 24, 2008

(30) Foreign Application Priority Data

Jul. 18, 2006 (DE) .......................... 10 2006 033 149

(51) Int. Cl.
| | | |
|---|---|---|
| *C10L 1/18* | (2006.01) | |
| *C08F 20/10* | (2006.01) | |
| *C08F 118/02* | (2006.01) | |
| *C10L 1/197* | (2006.01) | |
| *C10L 10/14* | (2006.01) | |
| *C10L 1/16* | (2006.01) | |
| *C10L 1/195* | (2006.01) | |
| *C10L 1/196* | (2006.01) | |
| *C10L 1/198* | (2006.01) | |
| *C10L 1/224* | (2006.01) | |
| *C10L 1/236* | (2006.01) | |

(52) U.S. Cl.
CPC .............. *C10L 1/1973* (2013.01); *C10L 10/14* (2013.01); *C10L 1/1641* (2013.01); *C10L 1/165* (2013.01); *C10L 1/1658* (2013.01); *C10L 1/1955* (2013.01); *C10L 1/1963* (2013.01); *C10L 1/1966* (2013.01); *C10L 1/1981* (2013.01); *C10L 1/1985* (2013.01); *C10L 1/224* (2013.01); *C10L 1/2364* (2013.01)
USPC .................. 44/393; 44/389; 44/395; 526/319; 526/328

(58) Field of Classification Search
CPC ..... C10L 1/1985; C10L 1/224; C10L 1/2364; C10L 1/1973; C10L 1/1641; C10L 1/165; C10L 1/1658; C10L 1/1955; C10L 1/1963; C10L 1/1966; C10L 1/1981; C10L 10/14
USPC ............. 44/393, 395, 389; 525/221; 526/319, 526/328, 500
See application file for complete search history.

(56) References Cited

U.S. PATENT DOCUMENTS

| | | | |
|---|---|---|---|
| 3,447,915 A | 6/1969 | Otto | |
| 3,961,916 A | 6/1976 | Ilnyckyj et al. | |
| 4,178,950 A | 12/1979 | Sweeney | |
| 4,211,534 A | 7/1980 | Feldman et al. | |
| 4,670,516 A | 6/1987 | Sackmann et al. | |
| 5,186,720 A | 2/1993 | Feustel et al. | |
| 5,391,632 A | 2/1995 | Krull et al. | |
| 5,766,273 A | 6/1998 | Dralle-Voss et al. | |
| 5,767,190 A | 6/1998 | Krull et al. | |
| 6,090,169 A | 7/2000 | Krull et al. | |
| 6,143,044 A * | 11/2000 | Davies et al. | .................... 44/393 |
| 6,248,141 B1 | 6/2001 | Davies et al. | |
| 6,508,848 B1 * | 1/2003 | Peiffer et al. | .................... 44/393 |
| 6,509,424 B1 | 1/2003 | Krull et al. | |
| 6,565,616 B1 | 5/2003 | Krull et al. | |
| 2004/0226216 A1 * | 11/2004 | Krull et al. | ....................... 44/393 |
| 2005/0108924 A1 | 5/2005 | Krull | |

FOREIGN PATENT DOCUMENTS

| | | |
|---|---|---|
| CA | 2017126 | 11/1990 |
| CA | 2020571 | 1/1991 |
| DE | 1924823 | 12/1969 |
| DE | 1645798 | 12/1971 |
| DE | 2037673 | 1/1972 |
| DE | 161128 | 2/1985 |
| DE | 3501384 | 7/1986 |
| DE | 19729057 | 1/1999 |
| EP | 0099646 | 2/1984 |
| EP | 0154177 | 9/1985 |
| EP | 0190553 | 8/1986 |
| EP | 0203554 | 12/1986 |
| EP | 0217602 | 4/1987 |
| EP | 0271738 | 6/1988 |
| EP | 0398101 | 11/1990 |
| EP | 0406684 | 1/1991 |
| EP | 0413279 | 2/1991 |
| EP | 0606055 | 7/1994 |
| EP | 0741181 | 11/1996 |
| EP | 0777712 | 6/1997 |
| EP | 0807642 | 11/1997 |

(Continued)

OTHER PUBLICATIONS

English abstract for DD161128.
English abstract for DE1924823.
English abstract for DE2037673.
English abstract for DE3501384.
English abstract for DE19729057.
English abstract for EP0190553.
English abstract for EP0203554.
English abstract for EP0271738.
English abstract for EP0890589.

(Continued)

*Primary Examiner* — James Goloboy
*Assistant Examiner* — Latosha Hines
(74) *Attorney, Agent, or Firm* — Tod A. Waldrop

(57) ABSTRACT

The invention thus provides terpolymers of ethylene, at least one ethylenically unsaturated ester and propene, which have
i) from 4.0 to 12.0 mol % of structural units derived from at least one ethylenically unsaturated ester having a $C_4$- to $C_{20}$-alkyl radical,
ii) from 0.5 to 4.0 methyl groups derived from propene per 100 aliphatic carbon atoms, and
iii) fewer than 8.0 methyl groups stemming from chain ends per 100 $CH_2$ groups.

10 Claims, No Drawings

(56) References Cited

FOREIGN PATENT DOCUMENTS

| EP | 0890589 | 1/1999 |
| EP | 0922716 | 6/1999 |
| EP | 0931825 | 7/1999 |
| EP | 1146108 | 10/2001 |
| EP | 1526168 | 4/2005 |
| GB | 1205772 | 9/1970 |
| WO | WO 9400537 | 1/1994 |
| WO | WO 9606902 | 3/1996 |

OTHER PUBLICATIONS

McCord, E.F., et al., "Short-Chain Branching Structures in Ethylene Copolymers prepared by High-Pressure Free-Radical Polymerization: An NMR Analysis", Macromolecules, 1997, 30, pp. 246-256.

European Search Report for EP 07 01 1539 dated Dec. 23, 2010.

* cited by examiner

ADDITIVES FOR IMPROVING THE COLD PROPERTIES OF FUEL OILS

The present invention relates to additives comprising ethylene-propylene-vinyl ester terpolymers which have improved handling and improved performance properties as cold additives for fuel oils.

Crude oils and middle distillates, such as gas oil, diesel oil or heating oil, obtained by distillation of crude oils contain, depending on the origin of the crude oils, different amounts of n-paraffins which crystallize out as platelet-shaped crystals when the temperature is reduced and sometimes agglomerate with inclusion of oil. This crystallization and agglomeration causes a deterioration in the flow properties of the oils or distillates, which may result in disruption in the course of extraction, transport, storage and/or use of the mineral oils and mineral oil distillates. When mineral oils are transported through pipelines, the crystallization phenomenon can, especially in winter, lead to deposits on the pipe walls and, in individual cases, for example in the event of stoppage of a pipeline, even to its complete blockage. In the storage and further processing of the mineral oils, it may also be necessary in winter to store the mineral oils in heated tanks in order to ensure their flowability. In the case of mineral oil distillates, the consequence of crystallization may be blockages of the filters in diesel engines and boilers, which prevents reliable metering of the fuels and, under some circumstances, results in complete interruption of the fuel or heating medium supply.

In addition to the classical methods of eliminating the crystallized paraffins (thermally, mechanically or with solvents), which merely involve the removal of the precipitates which have already formed, chemical additives, known as flow improvers, are increasingly being used. These additives often comprise two components: firstly constituents which act as additional crystal seeds, crystallize out with the paraffins and bring about a larger number of smaller paraffin crystals with modified crystal form (nucleates), and secondly constituents which restrict the growth of the crystals once they have formed (arrestors). The modified paraffin crystals have a lesser tendency to agglomerate, so that the oils admixed with these additives can still be pumped and processed at temperatures which are often more than 20° C. lower than in the case of nonadditized oils.

In view of decreasing world oil reserves, ever heavier and hence paraffin-richer crude oils are being extracted and processed, which consequently also lead to paraffin-richer fuel oils. In addition, the hydrogenating desulfurization of fuel oils, which is increasing for environmental reasons, causes altered processing of the crude oils, which leads in some cases to an increased proportion of cold-critical paraffins in the fuel oil. In such oils, effectiveness of the known prior art additives is often unsatisfactory. Moreover, the low tolerances of modern engine technology, which are required for compliance with emission values, require very clean fuel oils. However, the known prior art additives, especially the additive components used as crystal seed formers, often comprise small proportions of relatively insoluble constituents which recrystallize in some cases and can lead to problems in the injection systems and to deposits in the upstream fuel filters.

A known additive class which is used in many cases for the improvement of the cold properties of mineral oils and middle distillates produced therefrom is that of copolymers of ethylene and vinyl esters. The polymers are partly crystalline polymers whose mode of action is explained by cocrystallization of their poly(ethylene) sequences with the n-paraffins which precipitate out of the middle distillates in the course of cooling. This physical interaction modifies shape, size and adhesion properties of the precipitating paraffin crystals to the effect that many small crystals form, which pass through the fuel filter and can be fed to the combustion chamber.

The ethylene copolymers used as crystal seed formers or nucleating agents in particular must have a low solubility in the oil to fulfill their function, in order to crystallize with or just before the paraffins when the oil is cooled. The crystal seed formers used are preferably ethylene copolymers with low comonomer content and hence long free poly(ethylene) sequences, which are capable to a particularly high degree of cocrystallization with the long-chain paraffins which precipitate out of the oil first. In order, though, to be completely dissolved above the cloud point of the oil and not themselves be the cause of filter blockages, these ethylene-vinyl ester copolymers require, owing to their elevated intrinsic crystallinity, handling and dosage at elevated temperature or alternatively transport and processing in high dilution with solvents. Otherwise, there is the risk that the additives remain undissolved, as a result of which they cannot display their full effect and may additionally themselves be the cause of filter coverage and filter blockage.

In addition, the injection units and pumps of current engine designs in particular require very clean fuels. Even small proportions of undissolved additive constituents are extremely undesired in this context. Removal of such secondary constituents from polymers by filtration is very difficult, if indeed possible at all.

It is known that the intrinsic flowability of ethylene-vinyl ester copolymers and their dispersions can be improved by a high proportion of so-called short-chain branches, as can be established, for example, by polymerization at high temperatures and/or low pressures. These short-chain branches form through intramolecular chain transfer reactions ("back-biting mechanism") during the free-radical chain polymerization and consist essentially of butyl and ethyl radicals (see, for example, Macromolecules 1997, 30, 246-256). However, these short-chain branches reduce the effectiveness of these polymers as cold additives significantly.

Structures comparable to the short-chain branches and associated effects are obtained by the incorporation of branched comonomers such as isobutylene (EP-A-0 099 646), 4-methylpentene (EP-A-0 807 642) or diisobutylene (EP-A-0 203 554) in EVA copolymers: Although an improvement in the flowability and the solubility of the polymers is observed with increasing incorporation of these monomers, their effectiveness as a cold additive also falls simultaneously.

EP-A-0 890 589 discloses copolymers of lower olefins and at least 3 mol % of vinyl esters of saturated, branched carboxylic acids having from 7 to 17 carbon atoms, in which the alkyl radical is bonded by its tertiary carbon atom to the carboxyl function.

U.S. Pat. No. 3,961,916 discloses fuel oils which, for improvement in the cold flow properties, comprise two copolymers of ethylene and unsaturated esters, which function as nucleators or arrestors for paraffin crystallization.

EP-A-0 217 602 discloses copolymers of ethylene and ethylenically unsaturated esters with $C_1$-$C_{18}$-alkyl radicals and their use as cold additives for fuel oils. The examples are restricted to vinyl acetate and methyl acrylate.

EP-A-0 741 181 discloses mixtures of copolymers of ethylene and vinyl esters, of which at least one bears a vinyl ester with an alkyl radical having at least 4 carbon atoms, and their use for improving the low-temperature properties of an oil.

WO 94/00537 discloses copolymers of ethylene and ethylenically unsaturated esters which bear an alkyl radical having at least 2 carbon atoms and their use for improving the cold properties of wax-containing oils. In example 5, a mixture of two ethylene-vinyl hexanoate copolymers with different comonomer contents, molecular weights and degrees of branching is used.

EP-A-0 931 824 discloses additives for improving the cold flow properties of mineral oils and mineral oil distillates, comprising copolymers of ethylene and vinyl esters of tertiary carboxylic acids. These additives exhibit improved solubility, so that the filterability of the oils additized with them is maintained even at low mixing-in temperatures of oil and/or additive.

The high intrinsic crystallinity of known nucleators leads, in additive formulations, often to incompatibilities, especially with ethylene copolymers which act as arrestors and have a significantly higher comonomer content. This can lead to undesired opacity and precipitation and hence to inhomogeneous additives which can no longer be used reproducibly.

Although it is possible to improve the intrinsic flowability of polymers of ethylene and unsaturated esters by virtue of short-chain branches or else relatively long-chain and especially branched olefin comonomers, this is often accompanied by a loss in activity as cold flow improvers, since the optimal range of the polyethylene sequence lengths for cocrystallization with paraffins is departed from, and even relatively small amounts of the comonomers bring about such great disruption to the polyethylene sequences that effective cocrystallization with the paraffins of the oil and especially stimulation of paraffin crystallization (nucleation) is no longer possible. In addition, these nucleators often comprise very sparingly soluble fractions which recrystallize out of the oil and can lead to blockages of filters and injection systems.

The incorporation of relatively large amounts of the known branched olefins such as isobutylene, 4-methylpentene or isobutylene into polymers of ethylene and unsaturated esters is additionally restricted by the fact that these olefins have such a strong moderating effect on the polymerization that the requirement for initiators reaches a level prohibitive for commercial applications, a sufficiently high molecular weight is not attained and/or that a conversion of commercial interest cannot be achieved in the polymerization. In addition, the resulting highly short chain-branched products do not exhibit sufficient effectiveness as nucleating agents for paraffin crystallization.

It was consequently an object of the present invention to provide additives for improving the cold flowability of fuel oils, which are free-flowing and pumpable in highly concentrated form at very low temperatures, exhibit improved effectiveness over the prior art additives as cold flow improvers, and do not contain any insoluble fractions which lead to valve and/or filter blockages. In addition, these additives should have an improved tolerability with ethene copolymers having a relatively high comonomer content (arrestors).

It has now been found that additive concentrates which comprise terpolymers with few short chain branches of ethylene, propene and ethylenically unsaturated esters having a $C_4$- to $C_{20}$-alkyl radical exhibit very good handling at low temperatures and simultaneously superior effectiveness as cold additives. In addition, these additives comprise a lower level of sparingly soluble fractions and exhibit improved compatibility with ethylene copolymers effective as arrestors. It is of particular significance in this context that the propylene is incorporated as comonomer and is bonded to the chain end not just in the sense of a moderator.

The invention thus provides terpolymers of ethylene, at least one ethylenically unsaturated ester and propene, which have
i) from 4.0 to 12.0 mol % of structural units derived from at least one ethylenically unsaturated ester having a $C_4$- to $C_{20}$-alkyl radical,
ii) from 0.5 to 4.0 methyl groups derived from propene per 100 aliphatic carbon atoms, and
iii) fewer than 8.0 methyl groups stemming from chain ends per 100 $CH_2$ groups.

The invention further provides for the use of the inventive terpolymer for improving the cold flowability of fuel oils.

The invention further provides a process for improving the cold flowability of fuel oils by adding at least one inventive terpolymer to the fuel oil.

The invention further provides fuel oils having improved cold flowability, comprising at least one inventive terpolymer and a middle distillate.

The invention further provides additive mixtures, comprising
A) at least one inventive terpolymer, and
B) from 0.5 to 20 parts by weight, based on A), of at least one further component which is effective as a cold additive for mineral oils and is selected from
B1) copolymers of ethylene and ethylenically unsaturated compounds whose content of ethylenically unsaturated compounds is at least 2 mol % higher than the content of ethylenically unsaturated esters in the terpolymer defined under A),
B2) comb polymers, and
B3) mixtures of B1) and B2).

The invention further provides for the use of additive mixtures of A) and B) for improving the cold flowability of fuel oils.

The invention further provides a process for improving the cold flowability of fuel oils by adding an additive mixture of A) and B) to the fuel oil.

The invention further provides fuel oils with improved cold flowability, comprising an additive mixture of A) and B).

Unsaturated esters suitable in accordance with the invention for component A) are in particular vinyl esters of carboxylic acids having from 5 to 21 carbon atoms and esters of acrylic and methacrylic acid with fatty alcohols having from 4 to 20 carbon atoms.

Particularly preferred ethylenically unsaturated esters are vinyl esters of carboxylic acids having from 2 to 12 carbon atoms. They are preferably those of the formula 1

$$CH_2=CH-OCOR^1 \qquad (1)$$

in which $R^1$ is $C_4$- to $C_{20}$-alkyl, preferably $C_6$- to $C_{18}$-alkyl and especially $C_8$- to $C_{12}$-alkyl. The alkyl radicals may be linear or branched. The alkyl radicals are preferably branched and the branch is in particular located in α-position to the carbonyl group. The alkyl radical is more preferably bonded to the carbonyl group via a tertiary carbon atom. Examples of suitable vinyl esters are vinyl butyrate, vinyl isobutyrate, vinyl pentanoate, vinyl pivalate, vinyl n-hexanoate, vinyl 2-ethylhexanoate, vinyl neononanoate, vinyl neodecanoate, vinyl neoundecanoate, vinyl laurate and vinyl stearate.

Further preferred ethylenically unsaturated esters are esters of acrylic and methacrylic acid with fatty alcohols having from 1 to 12 carbon atoms. They are preferably those of the formula 2

$$CH_2=CR^2-COOR^3 \qquad (2)$$

in which $R^2$ is hydrogen or methyl and $R^3$ is $C_4$- to $C_{20}$-alkyl, preferably $C_6$- to $C_{18}$-alkyl, especially $C_8$- to $C_{12}$- alkyl. The alkyl radicals may be linear or branched. The alkyl radicals are preferably branched and the branch is in particular located in α-position to the carbonyl group. Suitable (meth)acrylic esters include, for example, n- and isobutyl (meth)acrylate, n- and isohexyl, n- and isooctyl(meth)acrylate, 2-ethylhexyl(meth)acrylate, decyl(meth)acrylate, dodecyl (meth)acrylate, isotridecyl(meth)acrylate and mixtures of these comonomers.

The content in the inventive terpolymers of unsaturated ester is preferably between 4.5 and 10.0 mol %, and in particular between 5.0 and 9.0 mol %, for example between 5.0 and 8.0 mol %. The comonomer content is determined by means of pyrolysis of the polymer and subsequent titration of the eliminated carboxylic acid.

The inventive terpolymers may additionally contain minor amounts of, for example, up to 3.0 mol %, preferably up to 2.0 mol %, for example from 0.1 to 1.0 mol %, of structural units which derive from unsaturated esters with relatively short alkyl chains. Unsaturated esters suitable for this purpose are vinyl esters of the formula (1) and/or (meth)acrylic esters of the formula (2) in which $R^2$ and $R^3$ are each independently an alkyl radical having from 1 to 3 carbon atoms. Vinyl acetate is particularly preferred.

The content in the inventive terpolymers of methyl groups which derive from propene is preferably between 0.6 and 4.0 and in particular between 0.8 and 3.5, for example between 0.9 and 3.0, methyl groups per 100 aliphatic carbon atoms.

The number of methyl groups derived from propene (propene-$CH_3$) per 100 aliphatic carbon atoms in the inventive terpolymer is determined by means of $^{13}C$ NMR spectroscopy. For instance, terpolymers of ethylene, vinyl ester and propene exhibit a characteristic signal of methyl groups bonded to the polymer backbone between about 19.3 and 19.9 ppm, which have a positive sign in the DEPT experiment. The integral of this signal of the methyl side groups of the polymer backbone which are derived from propene is determined relative to that of all other aliphatic carbon atoms of the polymer backbone between about 6 and 44 ppm. Signals which stem from the alkyl radicals of the unsaturated esters and overlap with the signals of the polymer backbone are subtracted from the total integral of the aliphatic carbon atoms on the basis of the signal of the methine group adjacent to the carbonyl group of the unsaturated ester. Such measurements can be performed, for example, with NMR spectrometers at a measurement frequency of 125 MHz at 30° C. in solvents such as $CDCl_3$ or $C_2D_2Cl_4$.

The number of methyl groups stemming from chain ends in the inventive terpolymers is preferably between 2.5 and 8.0 $CH_3$/100 $CH_2$ groups and in particular between 3.0 and 7.5 $CH_3$/100 $CH_2$ groups, for example between 3.5 and 7.0 $CH_3$/100 $CH_2$ groups.

The number of methyl groups stemming from chain ends is understood to mean all of those methyl groups of the inventive terpolymer which do not stem from the unsaturated esters used as comonomers. This is consequently understood to mean both the methyl groups present on the main chain ends including the methyl groups derived from structural units of the moderator and the methyl groups stemming from short-chain branches.

The number of methyl groups stemming from chain ends is determined by means of $^1H$ NMR spectroscopy by determining the integral of the signals of the methyl protons which appear in the $^1H$ NMR spectrum typically at a chemical shift between about 0.7 and 0.9 ppm (relative to TMS) relative to the integral of the signals of the methylene and methine protons which appear at from 0.9 to 1.9 ppm. The methyl and methylene groups stemming from alkyl radicals of the comonomers are not included or are eliminated from the calculation. The signals attributable to structural units of the moderators are accordingly attributable to the methyl or methylene protons. The number of methyl groups stemming from propene, which has been determined by means of $^{13}C$ NMR spectroscopy, is subtracted from the resulting value in order to obtain the number of methyl groups stemming from chain ends. Suitable $^1H$ NMR spectra can be recorded, for example, at a measurement frequency of 500 MHz at 30° C. in solvents such as $CDCl_3$ or $C_2D_2Cl_4$.

The sum G of molar content of unsaturated ester i) and the number of methyl groups derived from propene per 100 aliphatic carbon atoms of the polymer ii)

$G = [\text{mol \% of unsaturated ester}] + [\text{propene-}CH_3]$ is preferably between 5.5 and 11.0 and preferably between 6.0 and 10.0, for example between 6.5 and 9.0. The two summands should be added as dimensionless numbers.

The weight-average molecular weight Mw of the inventive terpolymers, which is determined by means of gel permeation chromatography against poly(styrene) standards is preferably between 2500 and 50 000 g/mol, preferably between 4000 and 30 000 g/mol, for example between 5000 and 25 000 g/mol. The melt viscosity of the inventive terpolymers determined at 140° C. is between 100 and 5000 mPas, preferably between 150 and 2500 mPas and in particular between 200 and 2000 mPas.

For all analyses, the polymer is freed beforehand of residual monomers and any solvent fractions at 140° C. under reduced pressure (100 mbar) for two hours.

The inventive ethylene terpolymers and also the polymers B1 of this invention are independently preparable by customary copolymerization processes, for example suspension polymerization, solvent polymerization, gas phase polymerization or high-pressure bulk polymerization. Preference is given to performing high-pressure bulk polymerization at pressures above 100 MPa, preferably between 100 and 300 MPa, for example between 150 and 275 MPa, and temperatures of from 100 to 340° C., preferably from 150 to 310° C., for example between 200 and 280° C. Suitable selection of the reaction conditions and of the amounts of monomers used allows the propene content and also the extent of the short-chain branches/chain ends to be established. Thus, low reaction temperatures and/or high pressures in particular lead to low proportions of short-chain branches and hence to a low number of chain ends.

The reaction of the monomers is induced by free-radical-forming initiators (free-radical chain starters). This substance class includes, for example, oxygen, hydroperoxides, peroxides and azo compounds, such as cumene hydroperoxide, t-butyl hydroperoxide, dilauroyl peroxide, dibenzoyl peroxide, bis(2-ethylhexyl)peroxodicarbonate, t-butyl perpivalate, t-butyl permaleate, t-butyl perbenzoate, dicumyl peroxide, t-butyl cumyl peroxide, di(t-butyl)peroxide, 2,2'-azobis(2-methylpropanonitrile), 2,2'-azobis(2-methylbutyronitrile). The initiators are used individually or as a mixture of two or more substances in amounts of from 0.01 to 10% by weight, preferably from 0.05 to 5% by weight, based on the monomer mixture.

The high-pressure bulk polymerization is performed in known high-pressure reactors, for example autoclaves or tubular reactors, batchwise or continuously; particularly useful reactors have been found to be continuous tubular reactors. Solvents such as aliphatic and/or aromatic hydrocarbons or hydrocarbon mixtures, benzene or toluene, may be present in the reaction mixture. Preference is given to the essentially solvent-free procedure. In a preferred embodiment of the polymerization, the mixture of the monomers, the initiator and, when used, the moderator is fed to a tubular reactor via the reactor inlet and via one or more side branches. The comonomers and also the moderators may be metered into the reactor either together with ethylene or separately via sidestreams. In this case, the monomer streams may have different composition (EP-A-0 271 738 and EP-A-0 922 716).

It has been found to be advantageous to adjust the molecular weight of the polymers not solely via the moderating action of the propene but additionally to use moderators which essentially bring about only one chain transfer and are not incorporated into the polymer chain in the manner of comonomers. Methyl groups can thus be incorporated selectively into the polymer backbone as disruption sites, and polymers with improved effectiveness as cold flow improvers are obtained. Preferred moderators are, for example, saturated and unsaturated hydrocarbons, for example propane, hexane, heptane and cyclohexane, and also alcohols, for example butanol, and especially aldehydes, for example acetaldehyde, propionaldehyde, n-butyraldehyde and isobutyraldehyde and also ketones, for example acetone, methyl ethyl ketone, methyl propyl ketone, methyl isopropyl ketone, methyl butyl ketone, methyl isobutyl ketone and cyclohexanone. Hydrogen is also suitable as a moderator.

In a particularly preferred embodiment, the inventive polymers, in addition to vinyl ester and propene, contain from 0.3 to 5.0% by weight, preferably from 0.5 to 3.5% by weight, of structural units which derive from moderator containing at least one carbonyl group. The concentration of these structural elements derived from the moderator in the polymer can likewise be determined by means of $^1$H NMR spectroscopy. This can be effected, for example, by correlating the intensity of the signals stemming from the vinyl ester, whose proportion in the polymer is known, with the signals of the methylene or methine group adjacent to the carbonyl group of the moderators, which appears at from about 2.4 to 2.5 ppm.

Suitable components B1) are one or more copolymers of ethylene and olefinically unsaturated compounds whose total comonomer content is higher by at least 2 mol %, preferably 3 mol %, than that of component A. Suitable ethylene copolymers are in particular those which, as well as ethylene, contain from 9 to 21 mol %, in particular from 10 to 18 mol %, of comonomers. Comonomers may, as well as olefinically unsaturated esters, also be other olefinically unsaturated compounds. Total comonomer content is understood to mean the content of monomers apart from ethylene.

The olefinically unsaturated compounds are preferably vinyl esters, acrylic esters, methacrylic esters, alkyl vinyl ethers and/or alkenes, and the compounds mentioned may be substituted by hydroxyl groups. One or more comonomers may be present in the polymer.

The vinyl esters are preferably those of the formula 3

$$CH_2=CH-OCOR^4 \quad (3)$$

where $R^4$ is $C_1$- to $C_{30}$-alkyl, preferably $C_4$- to $C_{16}$-alkyl, especially $C_6$- to $C_{12}$-alkyl. In a further embodiment, the alkyl groups mentioned may be substituted by one or more hydroxyl groups.

In a preferred embodiment, the component B1 is copolymers of ethylene and from 8 to 12 mol % vinyl acetate and a melt viscosity measured at 140° C. of from 50 to 300 mPas.

In a further preferred embodiment, these ethylene copolymers contain vinyl acetate and at least one further vinyl ester of the formula 3 where $R^4$ is $C_4$- to $C_{30}$-alkyl, preferably $C_4$- to $C_{16}$-alkyl, especially $C_6$- to $C_{12}$-alkyl.

In a further embodiment, $R^4$ is a branched alkyl radical or a neoalkyl radical having from 7 to 11 carbon atoms, in particular having 8, 9 or 10 carbon atoms. Particularly preferred vinyl esters derive from secondary and especially tertiary carboxylic acids whose branch is in the alpha-position to the carbonyl group. Suitable vinyl esters include vinyl acetate, vinyl propionate, vinyl butyrate, vinyl isobutyrate, vinyl hexanoate, vinyl heptanoate, vinyl octanoate, vinyl pivalate, vinyl 2-ethylhexanoate, vinyl laurate, vinyl stearate and Versatic esters such as vinyl neononanoate, vinyl neodecanoate, vinyl neoundecanoate.

The acrylic esters are preferably those of the formula 4

$$CH_2=CR^2-COOR^5 \quad (4)$$

where $R^2$ is hydrogen or methyl and $R^5$ is $C_1$- to $C_{30}$-alkyl, preferably $C_4$- to $C_{16}$-alkyl, especially $C_6$- to $C_{12}$-alkyl. Suitable acrylic esters include, for example, methyl (meth)acrylate, ethyl(meth)acrylate, propyl(meth)acrylate, n- and isobutyl(meth)acrylate, hexyl, octyl, 2-ethylhexyl, decyl, dodecyl, tetradecyl, hexadecyl, octadecyl (meth)acrylate and mixtures of these comonomers. In a further embodiment, the alkyl groups mentioned may be substituted by one or more hydroxyl groups. An example of such an acrylic ester is hydroxyethyl methacrylate.

The alkyl vinyl ethers are preferably compounds of the formula 5

$$CH_2=CH-OR^6 \quad (5)$$

where $R^6$ is $C_1$- to $C_{30}$-alkyl, preferably $C_4$- to $C_{16}$-alkyl, especially $C_6$- to $C_{12}$-alkyl. Examples include methyl vinyl ether, ethyl vinyl ether, isobutyl vinyl ether. In a further embodiment, the alkyl groups mentioned may be substituted by one or more hydroxyl groups.

The alkenes are preferably monounsaturated hydrocarbons having from 3 to 30 carbon atoms, in particular from 4 to 16 carbon atoms and especially from 5 to 12 carbon atoms. Suitable alkenes include propene, butene, isobutylene, pentene, hexene, 4-methylpentene, octene, diisobutylene and norbornene and derivatives thereof such as methylnorbornene and vinylnorbornene. In a further embodiment, the alkyl groups mentioned may be substituted by one or more hydroxyl groups.

Apart from ethylene, particularly preferred terpolymers of vinyl 2-ethylhexanoate, of vinyl neononanoate or of vinyl neodecanoate preferably contain from 3.5 to 20 mol %, in particular from 8 to 15 mol %, of vinyl acetate, and from 0.1 to 12 mol %, in particular from 0.2 to 5 mol %, of the particular long-chain vinyl ester, the total comonomer content being between 9 and 21 mol %, preferably between 12 and 18 mol %. Further particularly preferred copolymers contain, in addition to ethylene and from 8 to 18 mol % of vinyl esters, also from 0.5 to 10 mol % of olefins such as propene, butene, isobutylene, hexene, 4-methylpentene, octene, diisobutylene and/or norbornene.

These ethylene co- and terpolymers preferably have melt viscosities at 140° C. of from 20 to 10 000 mPas, in particular from 30 to 5000 mPas, especially from 50 to 2000 mPas. The degrees of branching determined by means of $^1$H NMR spectroscopy are preferably between 1 and 9 $CH_3/100\ CH_2$ groups, in particular between 2 and 6 $CH_3/100\ CH_2$ groups, which do not stem from the comonomers.

The mixing ratio between the inventive terpolymers A) and ethylene copolymers B1) may, according to the application, vary within wide limits, the terpolymers A) as crystal seed formers often constituting the smaller proportion. Such additive mixtures preferably contain from 2 to 70% by weight, preferably from 3 to 50% by weight and especially from 5 to 20% by weight of constituent A and from 30 to 98% by weight, preferably from 50 to 97% by weight and especially from 70 to 95% by weight of constituent B1).

Comb polymers as component B2) are generally characterized in that they contain a polymer backbone to which, at regular intervals, long-chain branches or side chains, for example hydrocarbon chains having from about 8 to 50 carbon atoms, are bonded. These side chains may be bonded to the polymer backbone directly via a C—C bond or else via an ether, ester, amide or imide bond.

Suitable comb polymers as component B2) may, for example, be described by the formula

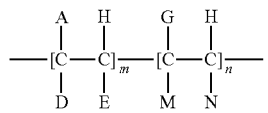

In this formula,

A is R', COOR', OCOR', R"—COOR', OR';

D is H, $CH_3$, A or R";

E is H, A;

G is H, R", R"—COOR', an aryl radical or a heterocyclic radical;

M is H, COOR", OCOR", OR", COOH;

N is H, R", COOR", OCOR", an aryl radical;

R' is a hydrocarbon chain having from 8 to 50 carbon atoms;

R" is a hydrocarbon chain having from 1 to 10 carbon atoms;

m is from 0.4 to 1.0; and n is from 0 to 0.6.

R' is preferably a hydrocarbon radical having from 10 to 24 carbon atoms and in particular a hydrocarbon radical having from 12 to 18 carbon atoms. R' is preferably linear or predominantly linear, i.e. R' contains at most one methyl or ethyl branch.

Suitable comb polymers are, for example, esterified copolymers of ethylenically unsaturated dicarboxylic acids such as maleic acid or fumaric acid or their reactive derivatives with other ethylenically unsaturated monomers such as olefins or vinyl esters. Particularly suitable olefins are α-olefins having from 10 to 24 carbon atoms, for example 1-decene, 1-dodecene, 1-tetradecene, 1-hexadecene, 1-octadecene and mixtures thereof. Suitable comonomers are also longer-chain olefins based on oligomerized $C_2$-$C_6$-olefins, for example poly(isobutylene) having a high proportion of terminal double bonds. Particularly preferred copolymers are those of maleic acid or maleic anhydride and/or fumaric acid with hexadecene, octadecene and with mixtures of these olefins. In a further preferred embodiment, the copolymers contain up to 15 mol %, for example from 1 to 10 mol %, of poly(isobutylene) having a molecular weight Mw between 300 and 5000 g/mol. Vinyl esters particularly suitable as comonomers derive from fatty acids having from 1 to 12 carbon atoms and in particular from 2 to 8 carbon atoms, for example vinyl acetate, vinyl propionate, vinyl butyrate, vinyl 2-ethylhexanoate, vinyl neononanoate, vinyl neodecanoate and vinyl neoundecanoate. Mixtures of different vinyl esters are also suitable. Particular preference is given to copolymers of fumaric acid with vinyl acetate.

Typically, these copolymers are esterified to an extent of at least 50% with alcohols having from 10 to 24 carbon atoms, for example having from 12 to 18 carbon atoms. Suitable alcohols include n-decan-1-ol, n-dodecan-1-ol, n-tetradecan-1-ol, n-hexadecan-1-ol, n-octadecan-1-ol, n-eicosan-1-ol and mixtures thereof. Particular preference is given to n-tetradecan-1-ol, n-hexadecan-1-ol and mixtures thereof.

Likewise suitable as comb polymers B2) are polymers and copolymers of α-olefins, and also esterified copolymers of styrene and maleic anhydride, and esterified copolymers of styrene and fumaric acid. Here too, preference is given to the abovementioned alcohols having from 10 to 24 carbon atoms for the esterification. In addition, poly(alkyl acrylates), poly (alkyl methacrylates) and poly(alkyl vinyl ethers) which derive from alcohols having from 12 to 20 carbon atoms, and also poly(vinyl esters) which derive from fatty acids having from 12 to 20 carbon atoms, are suitable as comb polymers. Likewise suitable are copolymers based on the aforementioned alkyl acrylates, methacrylates, alkyl vinyl ethers and/ or vinyl esters, for example copolymers of alkyl acrylates and vinyl esters. Mixtures of two or more comb polymers are also suitable in accordance with the invention.

The comb polymers of components B2) preferably have molecular weights Mw between approx. 2000 and approx. 50 000 g/mol, preferably between 3000 and 20 000 g/mol.

The mixing ratio between inventive terpolymers A) and comb polymer B2) is typically in the range from 10:1 to 1:3, preferably between 6:1 and 1:2, for example between 5:1 and 1:1. The mixing ratio between component B1) and comb polymer B2) is typically between 10:1 and 1:3, preferably between 6:1 and 1:2, for example between 5:1 and 1:1

For the purpose of better handling, the inventive additives and additive mixtures are typically used in the form of concentrates in organic solvents. Suitable solvents or dispersants are, for example, relatively high-boiling aliphatic hydrocarbons, aromatic hydrocarbons, alcohols, esters, ethers and mixtures thereof. Solutions or dispersions of the inventive additives or additive mixtures preferably contain from 10 to 90% by weight, in particular from 20 to 80% by weight and especially from 40 to 75% by weight of solvent.

It has been found that, surprisingly, the solutions of the inventive additives and additive mixtures have a lower intrinsic pour point than corresponding solutions based on copolymers of ethylene and unsaturated esters according to the prior art. In addition, they exhibit improved effectiveness in relation to cold flow improvement of fuel oils and in particular improved solubility in fuel oils even at low temperatures. These additives and additive mixtures can thus be used at low temperatures even without preceding heating of oil and/or additives without there being any filtration problems resulting from undissolved or recrystallized fractions of the inventive terpolymer A) in the additized oil. On the other hand, the inventive additives can be transported and processed at the same temperature with lower solvent content than corresponding prior art additives, which reduces transport and storage costs.

The inventive additives and additive mixtures may be added to middle distillates for improving the cold flowability also in combination with further additives, for example oil-soluble polar nitrogen compounds, alkylphenol resins, polyoxyalkylene compounds and/or olefin copolymers.

Suitable oil-soluble polar nitrogen compounds are preferably reaction products of fatty amines with compounds which contain an acyl group. The preferred amines are compounds of the formula $NR^7R^8R^9$ where $R^7$, $R^8$ and $R^9$ may be the same or different, and at least one of these groups is $C_8$-$C_{36}$-alkyl, $C_6$-$C_{36}$-cycloalkyl or $C_8$-$C_{36}$-alkenyl, in particular $C_{12}$-$C_{24}$-alkyl, $C_{12}$-$C_{24}$-alkenyl or cyclohexyl, and the remaining groups are either hydrogen, $C_1$-$C_{36}$-alkyl, $C_2$-$C_{36}$-alkenyl, cyclohexyl, or a group of the formulae -(A-O)$_x$-E or —(CH$_2$)$_n$—NYZ, where A is an ethyl or propyl group, x is a number from 1 to 50, E=H, $C_1$-$C_{30}$-alkyl, $C_5$-$C_{12}$-cycloalkyl or $C_6$-$C_{30}$-aryl, and n=2, 3 or 4, and Y and Z are each independently H, $C_1$-$C_{30}$-alkyl or -(A-O)$_x$. The alkyl and alkenyl radicals may each be linear or branched and contain up to two double bonds. They are preferably linear and substantially saturated, i.e. they have iodine numbers of less than 75 g of $I_2$/g, preferably less than 60 g of $I_2$/g and in particular between 1 and 10 g of $I_2$/g. Particular preference is given to secondary fatty amines in which two of the $R^7$, $R^8$ and $R^9$ groups are each $C_8$-$C_{36}$-alkyl, $C_6$-$C_{36}$-cycloalkyl, $C_8$-$C_{36}$-alkenyl, in particular $C_{12}$-$C_{24}$-alkyl, $C_{12}$-$C_{24}$-alkenyl or cyclohexyl. Suitable fatty amines are, for example, octylamine, decylamine, dodecylamine, tetradecylamine, hexadecylamine, octadecylamine, eicosylamine, behenylamine, didecylamine, didodecylamine, ditetradecylamine, dihexadecylamine, dioctadecylamine, dieicosylamine, dibehenylamine and mixtures thereof. The amines especially contain chain cuts based on natural raw materials, for example coconut fatty amine, tallow fatty amine, hydrogenated tallow fatty amine, dicoconut fatty amine, ditallow fatty amine and di(hydrogenated tallow fatty amine). Particularly preferred amine derivatives are amine salts, imides and/or amides, for example amide-ammonium salts of secondary fatty amines, in particular of dicoconut fatty amine, ditallow fatty amine and distearylamine.

Acyl group is understood here to mean a functional group of the following formula:

Carbonyl compounds suitable for the reaction with amines are either monomeric or polymeric compounds having one or more carboxyl groups. Preference is given to those monomeric carbonyl compounds having 2, 3 or 4 carbonyl groups. They may also contain heteroatoms such as oxygen, sulfur and nitrogen. Suitable carboxylic acids are, for example, maleic acid, fumaric acid, crotonic acid, itaconic acid, succinic acid, $C_1$-$C_{40}$-alkenylsuccinic acid, adipic acid, glutaric acid, sebacic acid and malonic acid, and also benzoic acid, phthalic acid, trimellitic acid and pyromellitic acid, nitrilotriacetic acid, ethylenediaminetetraacetic acid and their reactive derivatives, for example esters, anhydrides and acid halides. Useful polymeric carbonyl compounds have been found to be in particular copolymers of ethylenically unsaturated acids, for example acrylic acid, methacrylic acid, maleic acid, fumaric acid and itaconic acid; particular preference is given to copolymers of maleic anhydride. Suitable comonomers are those which impart oil solubility to the copolymer. Oil-soluble means here that the copolymer, after reaction with the fatty amine, dissolves without residue in the middle distillate to be additized in practically relevant dosages. Suitable comonomers are, for example, olefins, alkyl esters of acrylic acid and methacrylic acid, alkyl vinyl esters, alkyl vinyl ethers having from 2 to 75, preferably from 4 to 40 and in particular from 8 to 20, carbon atoms in the alkyl radical. In the case of olefins, the carbon number is based on the alkyl radical attached to the double bond. The molecular weights of the polymeric carbonyl compounds are preferably between 400 and 20 000 g/mol, more preferably between 500 and 10 000 g/mol, for example between 1000 and 5000 g/mol.

It has been found that particularly useful oil-soluble polar nitrogen compounds are those which are obtained by reaction of aliphatic or aromatic amines, preferably long-chain aliphatic amines, with aliphatic or aromatic mono-, di-, tri- or tetracarboxylic acids or their anhydrides (cf. U.S. Pat. No. 4,211,534). Equally suitable as oil-soluble polar nitrogen compounds are amides and ammonium salts of aminoalkyle nepolycarboxylic acids such as nitrilotriacetic acid or ethylenediaminetetraacetic acid with secondary amines (cf. EP 0 398 101). Other oil-soluble polar nitrogen compounds are copolymers of maleic anhydride and α,β-unsaturated compounds which may optionally be reacted with primary monoalkylamines and/or aliphatic alcohols (cf. EP-A-0 154 177, EP 0 777 712), the reaction products of alkenyl-spirobislactones with amines (cf. EP-A-0 413 279 B1) and, according to EP-A-0 606 055 A2, reaction products of terpolymers based on α,β-unsaturated dicarboxylic anhydrides, α,β-unsaturated compounds and polyoxyalkylene ethers of lower unsaturated alcohols.

The mixing ratio between the inventive additives or additive mixtures and oil-soluble polar nitrogen compounds may vary depending upon the application. Such additive mixtures preferably contain, based on the active ingredients, from 0.1 to 10 parts by weight, preferably from 0.2 to 5 parts by weight, of at least one oil-soluble polar nitrogen compound per part by weight of the inventive additive.

Suitable alkylphenol-aldehyde resins are in particular those alkylphenol-aldehyde resins which derive from alkylphenols having one or two alkyl radicals in the ortho- and/or para-position to the OH group. Particularly preferred starting materials are alkylphenols which bear, on the aromatic, at least two hydrogen atoms capable of condensation with aldehydes, and in particular monoalkylated phenols. The alkyl radical is more preferably in the para-position to the phenolic OH group. The alkyl radicals (for the alkylphenol resins, this is generally understood to mean hydrocarbon radicals as defined below) may be the same or different in the alkylphenol-aldehyde resins usable with the inventive additive mixtures. The alkyl radicals may be saturated or unsaturated. They may be linear or branched, preferably linear. They have 1-200, preferably 1-24, in particular 4-16, for example 6-12 carbon atoms; they are preferably n-, iso- and tert-butyl, n- and isopentyl, n- and isohexyl, n- and isooctyl, n- and isononyl, n- and isodecyl, n- and isododecyl, tetradecyl, hexadecyl, octadecyl, eicosyl, tripropenyl, tetrapropenyl, poly(propenyl) and poly(isobutenyl) radicals. In a preferred embodiment, the alkylphenol resins are prepared by using mixtures of alkylphenols with different alkyl radicals. For example, resins based firstly on butylphenol and secondly on octyl-, nonyl- and/or dodecylphenol in a molar ratio of from 1:10 to 10:1 have been found to be particularly useful.

Suitable alkylphenol resins may also contain or consist of structural units of further phenol analogs such as salicylic acid, hydroxybenzoic acid and derivatives thereof, such as esters, amides and salts.

Suitable aldehydes for the alkylphenol-aldehyde resins are those having from 1 to 12 carbon atoms and preferably having from 1 to 4 carbon atoms, for example formaldehyde, acetaldehyde, propionaldehyde, butyraldehyde, 2-ethylhexanal, benzaldehyde, glyoxalic acid and their reactive equivalents such as paraformaldehyde and trioxane. Particular preference is given to formaldehyde in the form of paraformaldehyde and especially formalin.

The molecular weight of the alkylphenol-aldehyde resins, measured by means of gel permeation chromatography against poly(styrene) standards in THF, is preferably 500-25 000 g/mol, more preferably 800-10 000 g/mol and especially 1000-5000 g/mol, for example 1500-3000 g/mol. A prerequisite here is that the alkylphenol-aldehyde resins are oil-soluble at least in concentrations relevant to use of from 0.001 to 1% by weight.

In a preferred embodiment of the invention, they are alkylphenol-formaldehyde resins which contain oligo- or polymers with a repeat structural unit of the formula

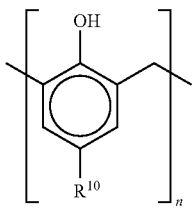

where $R^{10}$ is $C_1$-$C_{200}$-alkyl or -alkenyl, O—$R^{11}$ or O—C(O)—$R^{11}$, $R^{11}$ is $C_1$-$C_{200}$-alkyl or -alkenyl and n is from 2 to 100. $R^{11}$ is preferably $C_1$-$C_{20}$-alkyl or -alkenyl and in particular $C_4$-$C_{16}$-alkyl or -alkenyl, for example $C_6$-$C_{12}$-alkyl or -alkenyl. $R^{10}$ is more preferably $C_1$-$C_{20}$-alkyl or -alkenyl and in particular $C_4$-$C_{16}$-alkyl or -alkenyl, for example $C_6$-$C_{12}$-alkyl or -alkenyl. n is preferably from 2 to 50 and especially from 3 to 25, for example from 5 to 15.

For use in middle distillates such as diesel and heating oil, particular preference is given to alkylphenol-aldehyde resins with $C_2$-$C_{40}$-alkyl radicals of the alkylphenol, preferably with $C_4$-$C_{20}$-alkyl radicals, for example $C_6$-$C_{12}$-alkyl radicals. The alkyl radicals may be linear or branched, preferably linear. Particularly suitable alkylphenol-aldehyde resins derive from linear alkyl radicals having 8 and 9 carbon atoms.

For use in heavy heating oils and especially in fuel oils comprising distillation residues, particular preference is given to alkylphenol-aldehyde resins whose alkyl radicals bear from 4 to 50 carbon atoms, preferably from 10 to 30 carbon atoms. The degree of polymerization (n) here is preferably between 2 and 20, preferably between 3 and 10 alkylphenol units.

These alkylphenol-aldehyde resins are obtainable, for example by condensing the corresponding alkylphenols with formaldehyde, i.e. with from 0.5 to 1.5 mol, preferably from 0.8 to 1.2 mol of formaldehyde per mole of alkylphenol. The condensation can be effected without solvent, but is preferably effected in the presence of a water-immiscible or only partly water-miscible inert organic solvent such as mineral oils, alcohols, ethers and the like. Particular preference is given to solvents which can form azeotropes with water. The solvents of this type used are in particular aromatics such as toluene, xylene, diethylbenzene and relatively high-boiling commercial solvent mixtures such as ®Shellsol AB, and Solvent Naphtha. Also suitable as solvents are fatty acids and derivatives thereof, for example esters with lower alcohols having from 1 to 5 carbon atoms, for example ethanol and especially methanol. The condensation is effected preferably between 70 and 200° C., for example between 90 and 160° C. It is typically catalyzed by from 0.05 to 5% by weight of bases or preferably by from 0.05 to 5% by weight of acids. As acidic catalysts, in addition to carboxylic acids such as acetic acid and oxalic acid, in particular strong mineral acids such as hydrochloric acid, phosphoric acid and sulfuric acid, and also sulfonic acids, are useful catalysts. Particularly suitable catalysts are sulfonic acids which contain at least one sulfonic acid group and at least one saturated or unsaturated, linear, branched and/or cyclic hydrocarbon radical having from 1 to 40 carbon atoms and preferably having from 3 to 24 carbon atoms. Particular preference is given to aromatic sulfonic acids, especially the alkylaromatic monosulfonic acids having one or more $C_1$-$C_{28}$-alkyl radicals and especially those having $C_3$-$C_{22}$-alkyl radicals. Suitable examples are methanesulfonic acid, butanesulfonic acid, benzenesulfonic acid, p-toluenesulfonic acid, xylenesulfonic acid, 2-mesitylenesulfonic acid, 4-ethylbenzenesulfonic acid, isopropylbenzene-sulfonic acid, 4-butylbenzenesulfonic acid, 4-octylbenzenesulfonic acid; dodecylbenzenesulfonic acid, didodecylbenzenesulfonic acid, naphthalenesulfonic acid. Mixtures of these sulfonic acids are also suitable. Typically, after the reaction has ended, they remain in the product as such or in neutralized form. For neutralization, preference is given to using amines and/or aromatic bases, since they can remain in the product; salts which comprise metal ions and hence form ash are usually removed.

As a further constituent, suitable polyoxyalkylene compounds are, for example, esters, ethers and ether/esters of polyols which bear at least one alkyl radical having from 12 to 30 carbon atoms. When the alkyl groups stem from an acid, the remainder stems from a polyhydric alcohol; when the alkyl radicals come from a fatty alcohol, the remainder of the compound stems from a polyacid.

Suitable polyols are polyethylene glycols, polypropylene glycols, polybutylene glycols and their copolymers having a molecular weight of from approx. 100 to approx. 5000 g/mol, preferably from 200 to 2000 g/mol. Also suitable are alkoxylates of polyols, for example of glycerol, trimethylolpropane, pentaerythritol, neopentyl glycol, and also the oligomers which are obtainable therefrom by condensation and have from 2 to 10 monomer units, for example polyglycerol. Preferred alkoxylates are those having from 1 to 100 mol, in particular from 5 to 50 mol, of ethylene oxide, propylene oxide and/or butylene oxide per mole of polyol. Esters are particularly preferred.

Fatty acids having from 12 to 26 carbon atoms are preferred for reaction with the polyols to form the ester additives, particular preference being given to using $C_{18}$- to $C_{24}$ fatty acids, especially stearic acid and behenic acid. The esters may also be prepared by esterifying polyoxyalkylated alcohols. Preference is given to fully esterified polyoxyalkylated polyols with molecular weights of from 150 to 2000, preferably from 200 to 600. PEG-600 dibehenate and glycerol-ethylene glycol tribehenate are particularly suitable.

Olefin copolymers suitable as a further constituent of the inventive additive or of the additive mixture may derive directly from monoethylenically unsaturated monomers or be prepared indirectly by hydrogenating polymers which derive from polyunsaturated monomers such as isoprene or butadiene. Preferred copolymers contain, as well as ethylene, structural units which derive from α-olefins having from 3 to 24 carbon atoms and have molecular weights of up to 120 000 g/mol.

Preferred α-olefins are propylene, butene, isobutene, n-hexene, isohexene, n-octene, isooctene, n-decene, isodecene. The comonomer content of α-olefins having from 3 to 24 carbon atoms is preferably between 15 and 50 mol %, more preferably between 20 and 35 mol % and especially between 30 and 45 mol %. These copolymers may also contain small amounts, for example up to 10 mol %, of further comonomers, for example nonterminal olefins or nonconjugated olefins. Preference is given to ethylene-propylene copolymers. The olefin copolymers can be prepared by known methods, for example by means of Ziegler or metallocene catalysts.

Further suitable olefin copolymers are block copolymers which contain blocks of olefinically unsaturated aromatic monomers A and blocks of hydrogenated polyolefins B. Particularly suitable block copolymers are those of the structure $(AB)_nA$ and $(AB)_m$, where n is from 1 to 10 and m is from 2 to 10.

The mixing ratio between the inventive additives or additive mixtures and alkylphenol resins, polyoxyalkylene compounds and/or olefin copolymers may vary according to the application. Such mixtures preferably contain, based on the active ingredients, in each case from 0.1 to 10 parts by weight, preferably from 0.2 to 5 parts by weight, of at least one alkylphenol resin, of a polyoxyalkylene compound and/or of an olefin copolymer per part by weight of the inventive additive or of the inventive additive mixture.

The inventive additives and additive mixtures may be used alone or else together with other additives, for example with other pour point depressants or dewaxing assistants, with antioxidants, cetane number improvers, dehazers, demulsifiers, detergents, dispersants, defoamers, dyes, corrosion inhibitors, lubricity additives, sludge inhibitors, odorants and/or additives for lowering the cloud point.

The inventive additives and additive mixtures are suitable for improving the cold flow properties of animal, vegetable, mineral and/or synthetic fuel oils. At the same time, these additives and the additive mixtures prepared therefrom and their concentrated formulations in mineral oil-based solvents have low intrinsic pour points. This allows problem-free use of these additives and additive mixtures at lower temperatures and/or in higher concentrations than is possible with prior art additives. The additive mixtures can also be dosed in oils owing to their good solubility without there being any filter blockages by undissolved or recrystallized fractions of the inventive additive.

They are particularly suitable for improving the properties of mineral oils and mineral oil distillates in the middle distillate range, for example jet fuel, kerosene, diesel and heating oil. The inventive additives are especially suitable for lowering the CFPP value of middle distillates with very low cloud points of below −20° C. and especially below −22° C., for example below −25° C., and very low contents of less than 2 area % of n-paraffins having 20 or more carbon atoms. Inventive additive mixtures which comprise components A and B1 are suitable in particular for middle distillates with cloud points below +5° C., for example between −15° C. and +3° C. They are especially suitable for those oils which have a high content of particularly cold-critical paraffins having a carbon chain length of 20 and more carbon atoms of more than 4.0 area % and in particular more than 4.5 area %. Additive mixtures which comprise components A and B2 are suitable in particular for middle distillates with cloud points above −3° C. and especially with cloud points above 0° C., for example with cloud points above +5° C. The latter mixtures are especially suitable for those oils which have a high content of particularly cold-critical paraffins having a carbon chain length of 20 and more carbon atoms of more than 4.5 area % and in particular more than 5.0 area %. The paraffin content is determined by gas chromatography separation of the oil with detection by an FID detector and calculation of the integral of the n-paraffins with a chain length of at least 20 carbon atoms in relation to the total integral of the oil. For the purpose of lowering the sulfur content, they have frequently been subjected to refining under hydrogenating conditions and contain preferably less than 350 ppm of sulfur and in particular less than 100 ppm of sulfur, for example less than 50 ppm or 10 ppm of sulfur.

The inventive fuel oils preferably contain from 5 to 5000 ppm, more preferably from 10 to 2000 ppm and especially from 50 to 1000 ppm of the inventive additive mixtures.

Middle distillates refer in particular to those mineral oils which are obtained by distilling crude oil and boil in the range from 120 to 450° C., for example kerosene, jet fuel, diesel and heating oil. The inventive additive mixtures are particularly advantageous in those middle distillates which have 90% distillation points to ASTM D86 above 340° C., in particular above 360° C. and in special cases above 370° C. Middle distillates further comprise synthetic fuel oils in the boiling range from about 120 to 450° C., and also mixtures of mineral and synthetic middle distillates. Examples of synthetic middle distillates are especially fuels produced by the Fischer-Tropsch process from coal, natural gas or else biomass. In this case, synthesis gas is first prepared and converted to normal paraffins via the Fischer-Tropsch process. The normal paraffins thus prepared can subsequently be modified, for example, by catalytic cracking, isomerization, hydrocracking or hydroisomerization.

The inventive additive mixtures are also particularly effective in middle distillates which contain minor amounts, for example up to 30% by volume, of oils of animal and/or vegetable origin. Examples of suitable oils of animal and/or vegetable origin are both triglycerides and esters derived therefrom with lower alcohols having from 1 to 5 carbon atoms, such as ethyl and especially methyl esters, which are obtainable, for example, from cotton, palm kernels, rape, soya, sunflower, tallow and the like.

EXAMPLES

The following additives were used:
Preparation of the Ethylene Copolymers Used

In a continuous high-pressure autoclave, ethylene, vinyl ester and propylene were copolymerized with addition of a 10% by weight solution of bis(2-ethylhexyl) peroxodicarbonate as an initiator and methyl ethyl ketone as a molecular weight regulator. The polymer formed was removed from the reaction mixture and then freed of residual monomers.

For comparison, copolymers of ethylene and vinyl neodecanoate or 2-ethylhexyl vinyl ester prepared by the same process were employed.

The vinyl ester content was determined by means of pyrolysis of the polymer which had been freed of residual monomers at 150° C./100 mbar. To this end, 100 mg of the polymer are dissociated thermally with 200 mg of pure polyethylene in a pyrolysis flask at 450° C. in a closed system under reduced pressure for 5 minutes. Pyrolyzate and residue are dissolved in toluene and, after addition of 2-propanol, are titrated potentiometrically to the point of equivalence with a solution of KOH in ethanol (0.1 mol of KOH per liter of solution). The KOH consumption corresponds to the content of vinyl ester.

The total number of methyl groups in the polymer which do not stem from vinyl esters is determined by means of $^1$H NMR spectroscopy at a measurement frequency of 500 MHz on 10 to 15% solutions in $C_2D_2Cl_4$ at 300 K. The integral of the methylprotons between about 0.7 and 0.9 ppm is determined as a ratio relative to that of the methylene and methine protons between about 0.9 and 1.9 ppm. A correction of the number of the methyl groups for the structural units which are derived from the moderator used and overlap with the signals of the main chain is effected on the basis of the methine proton of the moderator which appears separately (for example, methyl ethyl ketone and propanal exhibit multiplets at 2.4 and 2.5 ppm).

The content of methyl groups which derive from propene is determined by means of $^{13}$C NMR spectroscopy at a measurement frequency of 125 MHz on likewise 10 to 15% solutions in $C_2D_2Cl_4$ at 300 K. The integral of the methyl groups derived from propene between 19.3 and 19.9 ppm is determined as a ratio relative to that of the aliphatic carbon atoms of the polymer backbone. To determine the integral of the aliphatic carbon atoms of the polymer backbone, the sum of the integrals between 6.0 and 19.3 ppm and 19.9 and 44 ppm is formed, and the proportion stemming from the alkyl radicals of the unsaturated esters is subtracted therefrom. The latter is obtainable via the structural formula of the unsaturated ester used from the signal of the methine protons derived from the unsaturated ester. The signals of the methine protons derived from the vinyl esters appear clearly separated from the other signals between 68 and 76 ppm. Advantageously, $^1$H and $^{13}$C NMR measurement is performed on the same sample.

The number of chain ends is determined by subtracting the number of methyl groups derived from propene, determined by means of $^{13}$C NMR, from the total number of methyl groups, determined by means of $^1$H NMR. The two values should be treated as dimensionless numbers.

TABLE 1

Characterization of the ethylene terpolymers A used

| Polymer | Vinyl ester [mol %] | Propene-CH$_3$ per 100 aliph. CH$_2$ | Number of chain ends [CH$_3$/100 CH$_2$] | V$_{140}$ [mPas] |
|---|---|---|---|---|
| A1 | 6.1 mol % of VeoVa | 1.0 | 5.2 | 227 |
| A2 | 5.7 mol % of VeoVa | 1.6 | 5.2 | 242 |
| A3 | 5.4 mol % of VeoVa | 2.3 | 4.3 | 276 |
| A4 | 6.5 mol % of VeoVa | 1.9 | 6.8 | 118 |
| A5 | 5.8 mol % of 2-EHVE | 1.7 | 5.0 | 289 |
| A65 (comp.) | 6.8 mol % of VeoVa | 0 | 5.3 | 200 |
| A7 (comp.) | 6.6 mol % of 2-EHVE | 0 | 4.8 | 231 |

VeoVa=vinyl neodecanoate; 2-EHVE=2-ethylhexyl vinyl ester

Characterization of the Additives B Used

B1-I) Copolymer of ethylene and 11.8 mol % of vinyl acetate with a melt viscosity measured at 140° C. of 210 mPas.

B1-II) Copolymer of ethylene and 13.3 mol % of vinyl acetate with a melt viscosity measured at 140° C. of 135 mPas.

B1-III) Terpolymer of ethylene, 13.7 mol % of vinyl acetate and 1.4 mol % of vinyl neodecanoate with a melt viscosity measured at 140° C. of 98 mPas.

B2-I) Alternating copolymer of maleic anhydride and octadecene, fully esterified with a mixture of equal parts of tetradecanol and hexadecanol.

All polymers A and B used were, unless stated otherwise, used as 50% dilutions in relatively high-boiling, predominantly aliphatic solvents.

Table 2: Characterization of the Test Oils:

The test oils used were current oils from European refineries. The CFPP value was determined to EN 116 and the cloud point to ISO 3015. The paraffin content is determined by gas chromatography separation of the oil with detection by an FID detector and calculation of the integral of the n-paraffins with a chain length of at least 20 carbon atoms in relation to the total integral.

| | Test oil 1 | Test oil 2 | Test oil 3 | Test oil 4 | Test oil 5 |
|---|---|---|---|---|---|
| Distillation | | | | | |
| IBP [° C.] | 190 | 157 | 152 | 189 | 187 |
| 20% [° C.] | 212 | 200 | 207 | 241 | 223 |
| 90% [° C.] | 305 | 379 | 354 | 335 | 337 |
| FBP [° C.] | 315 | 396 | 384 | 359 | 360 |
| Cloud Point [° C.] | −26 | +5.8 | +1.0 | −7.0 | −5.1 |
| CFPP [° C.] | −27 | +1 | −5 | −10 | −9 |
| Density @15° C. [g/cm$^3$] | 0.817 | 0.851 | 0.837 | 0.840 | 0.834 |
| Paraffin content ≥ C$_{20}$ [area %] | <1 | 6.1 | 5.6 | 4.4 | 7.9 |

Effectiveness of the Terpolymers as Cold Flow Improvers

The superior effectiveness of the inventive terpolymers for mineral oils and mineral oil distillates is described with reference to the CFPP test (Cold Filter Plugging Test to EN 116).

TABLE 3

Testing as a cold flow improver in test oil 1

| | | CFPP [° C.] | | |
|---|---|---|---|---|
| Example | Polymer | 100 ppm | 200 ppm | 300 ppm |
| 1 | A1 | −33 | −38 | <−40 |
| 2 | A2 | −31 | −39 | <−40 |
| 3 | A4 | −32 | −38 | <−40 |
| 4 (comp.) | A6 | −29 | −35 | −39 |

Table 4: Testing as a Cold Flow Improver in Test Oil 2

For the testing as cold flow improver in test oil 2, in each case one part of the inventive terpolymers was used with one part of the polymer B2-I and 0.5 part of the polymer B1-I. The dosage rate indicated relates to the total amount of additive used.

| | | CFPP [° C.] | | |
|---|---|---|---|---|
| Example | Terpolymer A | 100 ppm | 150 ppm | 200 ppm |
| 5 | A1 | −9 | −11 | −16 |
| 6 | A2 | −11 | −15 | −16 |
| 7 | A3 | −8 | −12 | −17 |
| 8 | A4 | −11 | −12 | −15 |
| 9 | A5 | −9 | −11 | −16 |
| 10 (comp.) | A6 | −7 | −10 | −14 |
| 11 (comp.) | A7 | −6 | −10 | −13 |

Table 5: Testing as a Cold Flow Improver in Test Oil 3

For the testing as cold flow improver in test oil 3, in each case two parts of the inventive terpolymers were used with 1.5 parts of the polymer B2-I and one part of the polymer B1-I. The dosage rate indicated relates to the total amount of additive used.

| | | CFPP [° C.] | | |
|---|---|---|---|---|
| Example | Terpolymer A | 100 ppm | 200 ppm | 300 ppm |
| 12 | A1 | −15 | −16 | −18 |
| 13 | A2 | −13 | −14 | −16 |
| 14 | A3 | −14 | −15 | −17 |
| 15 | A4 | −13 | −13 | −17 |
| 16 (comp.) | A6 | −10 | −12 | −14 |

Table 6: Testing as a Cold Flow Improver in Test Oil 4

For the testing as cold flow improver in test oil 4, in each case 1 part of the inventive terpolymers was used with 5 parts of the polymer B1-II. The dosage rate indicated relates to the total amount of additive used.

| Example | Terpolymer A | CFPP [° C.] | | |
|---|---|---|---|---|
| | | 50 ppm | 100 ppm | 200 ppm |
| 17 | A1 | −16 | −20 | −20 |
| 18 | A2 | −15 | −17 | −24 |
| 19 | A3 | −15 | −18 | −20 |
| 20 | A4 | −13 | −18 | −20 |
| 21 | A5 | −14 | −18 | −20 |
| 22 (comp.) | A6 | −13 | −17 | −19 |
| 23 (comp.) | A7 | −11 | −15 | −16 |

Handling of the Additive Concentrates

To assess the cold flowability of concentrates of the inventive terpolymers, the polymers described in table 1 were dissolved at 35% strength by weight in a predominantly aliphatic solvent mixture with boiling range of 175-260° C. and a flashpoint of 66° C. To this end, polymer and solvent were heated to 80° C. with stirring and, after homogenization, cooled to room temperature.

Subsequently, the intrinsic pour point of the concentrates was determined to DIN ISO 3016.

TABLE 7

Intrinsic pour point of the polymer concentrates

| Example | Terpolymer | Pour Point |
|---|---|---|
| 24 | A1 | +15 |
| 25 | A2 | +6 |
| 26 | A3 | −3 |
| 27 | A4 | −18 |
| 28 | A5 | +15 |
| 29 (comp.) | A6 | +21 |
| 30 (comp.) | A7 | +27 |

Filter Blocking Tendency of the Terpolymers

In addition, the filter blocking tendency of a test oil additized with inventive terpolymers was determined to IP 387/97. In this test, 300 ml of an additized diesel fuel are filtered through a 1.6 μm glass fiber filter at defined temperature and a pump output of 20 ml/min. The test is considered to have been passed when a volume of 300 ml passes through the filter without the pressure (p) having attained or exceeded 105 kPa (filter blocking tendency $FBT=(1+(p/105)^2)^{0.5}<1.41$). It is considered not to have been passed when the pressure reaches 105 kPa before the total volume (V) of 300 ml has passed through the filter (filter blocking tendency $FBT=(1+(300N)^2)^{0.5} \geq 1.41$). For the assessment of the terpolymers, it is important that the filter blocking tendency of the unadditized fuel is increased as little as possible by adding the terpolymer.

For the performance of the test, 350 ml of the test oil 5 of temperature 20 to 22° C. were admixed with 500 ppm of the terpolymer of temperature 60° C. (50% solution). After manual shaking and storage at 60° C. for 30 minutes, the additized oil was stored at 20° C. for 16 hours. Subsequently, the additized oil was used for filtration without shaking again.

TABLE 8

Filter blocking tendency of the additized test oil 5 to IP 387/97

| Example | Terpolymer | Filter blocking tendency |
|---|---|---|
| 31 (comp.) | none | 1.01 |
| 32 | A1 | 1.10 |
| 33 | A2 | 1.05 |
| 34 | A3 | 1.04 |
| 35 | A4 | 1.04 |
| 36 (comp.) | A5 | 2.12 |

Compatibility of the Polymers with Eva Copolymers

To assess the compatibility of the inventive terpolymers with ethylene copolymers which are effective as arrestors for paraffin crystallization and have a relatively high comonomer content, 35% by weight solutions of the inventive terpolymers with polymer B1-II in a weight ratio of 1:9 in Solvent Naphtha, a high boiling commercial, predominantly aromatic solvent mixture, were prepared and stored at 50° C. for 16 hours. Subsequently, the appearance was assessed visually. Precipitation and insoluble fractions show inadequate compatibility of the polymers.

TABLE 9

Compatibility with arrestors

| Example | Additive | | Visual assessment |
|---|---|---|---|
| 37 | A2 | B1-II | homogeneous; clear |
| 38 | A3 | B1-II | homogeneous; clear |
| 39 | A4 | B1-II | homogeneous; clear |
| 40 | A5 | B1-II | homogeneous; slightly cloudy |
| 41 (comp.) | A6 | B1-II | many large flakes |
| 42 (comp.) | A7 | B1-II | many flakes, sediment |

The experiments show that the inventive additives, with regard to the improvement in the cold flowability and especially the lowering of the CFPP of middle distillates, are superior to the prior art additives. At the same time, they are usable at relatively low temperatures. In particular, they are also usable in applications in which particularly clean fuels with very low filter blocking tendency are required.

The invention claimed is:

1. A terpolymer consisting of ethylene, propene,
    i) from 4.0 to 12.0 mol % of structural units derived from at least one ethylenically unsaturated ester, wherein the at least one ethylenically unsaturated ester is selected from the group consisting of ethylenically unsaturated esters having a $C_4$- to $C_{20}$-alkyl radical, and
    ii) up to 3 mol % of structural units derived from an ethylenically unsaturated ester with a short alkyl chain having from 1 to 3 carbon atoms
    wherein the terpolymer contains from 0.5 to 4.0 methyl groups derived from propene per 100 aliphatic carbon atoms, and fewer than 8.0 methyl groups stemming from chain ends per 100 $CH_2$ groups.

2. The terpolymer as claimed in claim 1, wherein the structural units derived from ethylenically unsaturated ester are between from 4.5 to 10 mol %.

3. The terpolymer as claimed in claim 1, in which the ethylenically unsaturated ester is a vinyl ester of a carboxylic acid having from 5 to 21 carbon atoms.

4. The terpolymer of claim 1, in which the methyl groups derived from propene ii) is between 0.6 and 4.0 per 100 aliphatic carbon atoms.

5. The terpolymer as claimed in claim 1, in which the methyl groups stemming from chain ends is between 2.5 and 8.0 $CH_3$/100 $CH_2$ groups.

6. The terpolymer of claim 1, in which a sum G of molar content of said unsaturated ester i) and the number of methyl groups derived from propene per 100 aliphatic carbon atoms of the polymer ii), according to the formula $$G=[\text{mol \% of unsaturated ester}]+[\text{propene-}CH_3]$$

is between 5.5 and 11.0.

7. The terpolymer of claim 1, in which the terpolymer has a weight-average molecular weight Mw determined by means of gel permeation chromatography against poly(styrene) standards of between 2500 and 50 000 g/mol.

8. An additive mixture comprising
   A) at least one terpolymer of claim 1, and
   B) from 0.5 to 20 parts by weight, based on A), of at least one further component which is effective as a cold additive for mineral oils and is selected from the group consisting of
      B1) a copolymer of ethylene and an olefinically unsaturated compound whose content of olefinically unsaturated compound is at least 2 mol % higher than the content of ethylenically unsaturated ester in the terpolymer A),
      B2) a comb polymer, and
      B3) mixtures of B1) and B2).

9. A process for improving the cold flowability of fuel oils by adding to the fuel oil at least one terpolymer of claim 1.

10. A fuel oil comprising a middle distillate and at least one terpolymer as claimed in claim 1.

\* \* \* \* \*